Sept. 30, 1969 CHISAYO HAYASHI ET AL 3,469,294

METHOD OF MAKING SOLID STATE ELECTROLYTIC CAPACITORS

Filed Sept. 29, 1966 5 Sheets-Sheet 1

INVENTORS

Chisayo Hayashi, Yusuke Chiba, Eiji Tanaka, Shigeyuki Ochi, Yuzuru Yanagisawa, & Masaaki Ayabe BY Hill, Sherman, Meroni, Gross & Simpson ATTORNEYS

METHOD OF MAKING SOLID STATE ELECTROLYTIC CAPACITORS

Filed Sept. 29, 1966 5 Sheets-Sheet 2

INVENTORS
Chisayo Hayashi, Yusuke Chiba, Eiji Tanaka,
Shigeyuki Ochi, Yuzuru Yanagisawa, & Masaaki Ayabe
BY Hill, Sherman, Meroni, Gross & Simpson
ATTORNEYS INVENTORS
Chisayo Hayashi, Yusuke Chiba, Eiji Tanaka,
Shigeyuki Ochi, Yuzuru Yanagisawa, Masaaki Ayabe
BY Hill, Sherman, Meroni, Gross & Simpson
ATTORNEYS

METHOD OF MAKING SOLID STATE ELECTROLYTIC CAPACITORS

Filed Sept. 29, 1966

INVENTORS
Chisayo Hayashi, Yusuke Chiba, Eiji Tanaka, Shigeyuki Ochi, Yuzuru Yanagisawa, & Masaaki Ayabe
BY Hill, Sherman, Meroni, Gross & Simpson ATTORNEYS INVENTORS
Chisayo Hayashi, Yusuke Chiba, Eiji Tanaka, Shigeyuki Ochi, Yuzuru Yanagisawa, & Masaaki Ayabe
BY Hill, Sherman, Meroni, Gross & Simpson
ATTORNEYS United States Patent Office 3,469,294
Patented Sept. 30, 1969

3,469,294
METHOD OF MAKING SOLID STATE ELECTROLYTIC CAPACITORS

Chisayo Hayashi, % Aoki-so, 709–9 Chofu-Ohtsuka, Ohta-ku, Tokyo, Japan; Yusuke Chiba, 895 Kogasaki, Matsudo-shi, Chiba-ken, Japan; Eiji Tanaka, % 25–208 Kodan-jutaku, 48–1 Myojindai, Hodogaya, Yokohama-shi, Kanagawa-ken, Japan; Shigeyuki Ochi, % Nishi, 1523 Takagi-cho, Meguro-ku, Tokyo, Japan; Yuzuru Yanagisawa, 17–104 Fujisawa-danchi, Daigiri, Fujisawa-shi, Kanagawa-ken, Japan; and Masaaki Ayabe, % Saito, 578 Kugahara-cho, Ohta-ku, Tokyo, Japan Filed Sept. 29, 1966, Ser. No. 582,897
Claims priority, application Japan, Sept. 30, 1965, 40/61,102; Oct. 11, 1965, 40/62,248; May 24, 1966, 41/33,394
Int. Cl. H01g 9/00, 13/00
U.S. Cl. 29—25.42 2 Claims

ABSTRACT OF THE DISCLOSURE

Method of making solid capacitors which involves electrolytically depositing a dielectric oxide layer on the surface of an anodizable metal strip, applying an insulating grid over the surface of the dielectric oxide, electrolytically depositing a semiconductor oxide onto the dielectric oxide layer through the grid, forming a cathode structure on each of the areas in which the semiconductor oxide has been deposited, and then severing the strip along the grid to provide a plurality of individual capacitors.

The present invention relates to methods of making capacitors, and to improved capacitors of the miniature type.

Miniature capacitors have heretofore been proposed which include a dielectric oxide layer formed on a foil or sheet of anodizable metal such as aluminum, totanium, columbium, tantalum, zirconium, hafnium, or the like, with a semiconductor layer, usually consisting of manganese dioxide or vanadium oxide deposited on the dielectric oxide layer to provide an electrode therefor. Such structures, however, usually evidence an objectionably high leakage current. In the manufacture of miniature, high capacitance capacitors, the dielectric oxide layer and the semiconductor layer must be extremely thin, so that when a sheet having a plurality of capacitors formed thereon is severed into individual elements, the underlying anodizable metal may make direct contact with the electrodes to produce shorting or breakage of the oxide layer, causing an increase in leakage current. In addition, the capacitance of the individual elements varies considerably between elements, so that it is difficult to maintain quality control. Furthermore, the electrolytic layer is quite fragile and is readily broken by small shocks during manufacture with the result that the electrical characteristics of the capacitor tend to vary.

The present invention is directed to providing a method for the manufacture of capacitors by means of which extremely thin semiconductor layers can be applied with uniform thickness on a metal sheet, thereby producing capacitor elements of uniform electrical characteristics without danger of shorting between the base metal sheet and the superimposed electrode.

One of the objects of the invention is to provide an improved method suitable for the mass production of electrolytic capacitors.

Another object of the invention is to provide an improved method for the manufacture of capacitors by means of which acceptable quality control may be maintained with respect to variation in capacitance values.

Another object of the invention is to provide a method for the manufacture of capacitors which can be of the miniature type but have high capacitance values and low dissipation factors.

Another object of the invention is to provide a method for the manufacture of capacitors which are protected from breakage due to physical treatment during manufacture.

Still another object of the invention is to provide an improved miniature capacitor having high capacitance and a low dissipation factor.

Other objects, features, and advantages of the present invention will become apparent from the following description taken in conjunction with the accompanying drawings, in which.

Figures 12A, 12B, 12C, 12D, 12E, 12F, 13, 14:
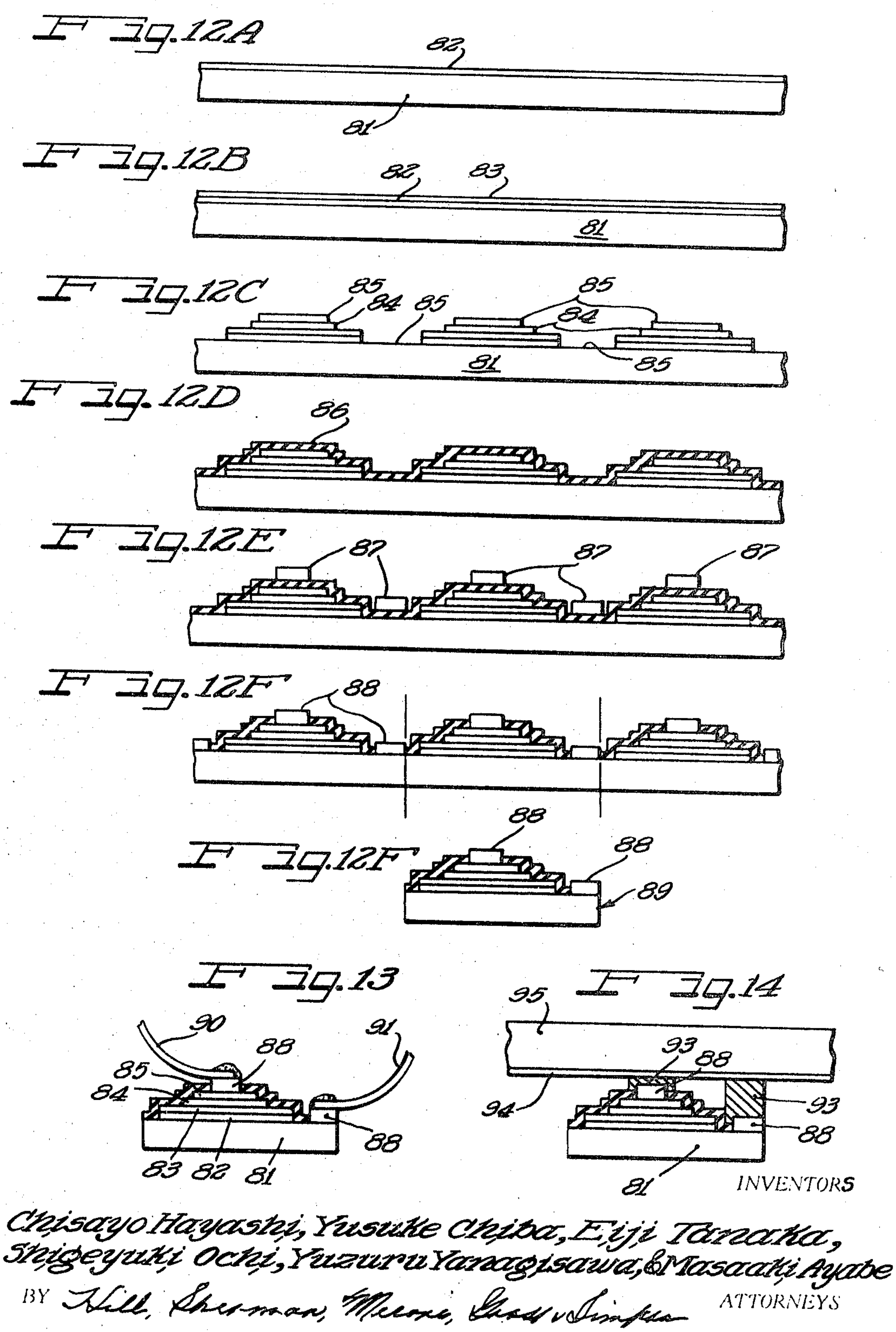

FIGURES 12A to 12G, inclusive, are diagrammatic representations of a still further modified form of the present invention;

FIGURE 13 is a view of a finished capacitor illustrating the manner of attaching the leads thereto; and FIGURE 14 is a view partly in elevation and partly in cross-section illustrating the manner in which the improved capacitor can be attached to a printed circuit board.

As shown in the drawings:

In FIGURE 1, reference numeral 20 indicates a relatively elongated base metal strip or foil which serves as the anode of the finished capacitor. The base metal 20 may consist of an anodizable metal such as titanium, aluminum, tantalum, columbium, zirconium, hafnium, or the like. At least one surface of the base metal sheet 20 has a dielectric oxide layer 21 thereon, typically produced by electrolytic anodization of the base metal in the manner to be described subsequently. Subsequent to the formation of the dielectric oxide layer 21, a semiconductor oxide layer 22 is applied, the semiconductor oxide layer typically consisting of manganese dioxide. As will appear from a succeeding portion of the specification, the manganese dioxide layer 22 is most conveniently applied by means of an electro-deposition plating process. The semiconductor oxide layer 22 is sufficiently thin and has a sufficiently high electrical resistance so that it does not exert an adverse influence on the underlying oxide layer 21.

Figures 1A, 1B, 1C, 1D, 1E, 1F:
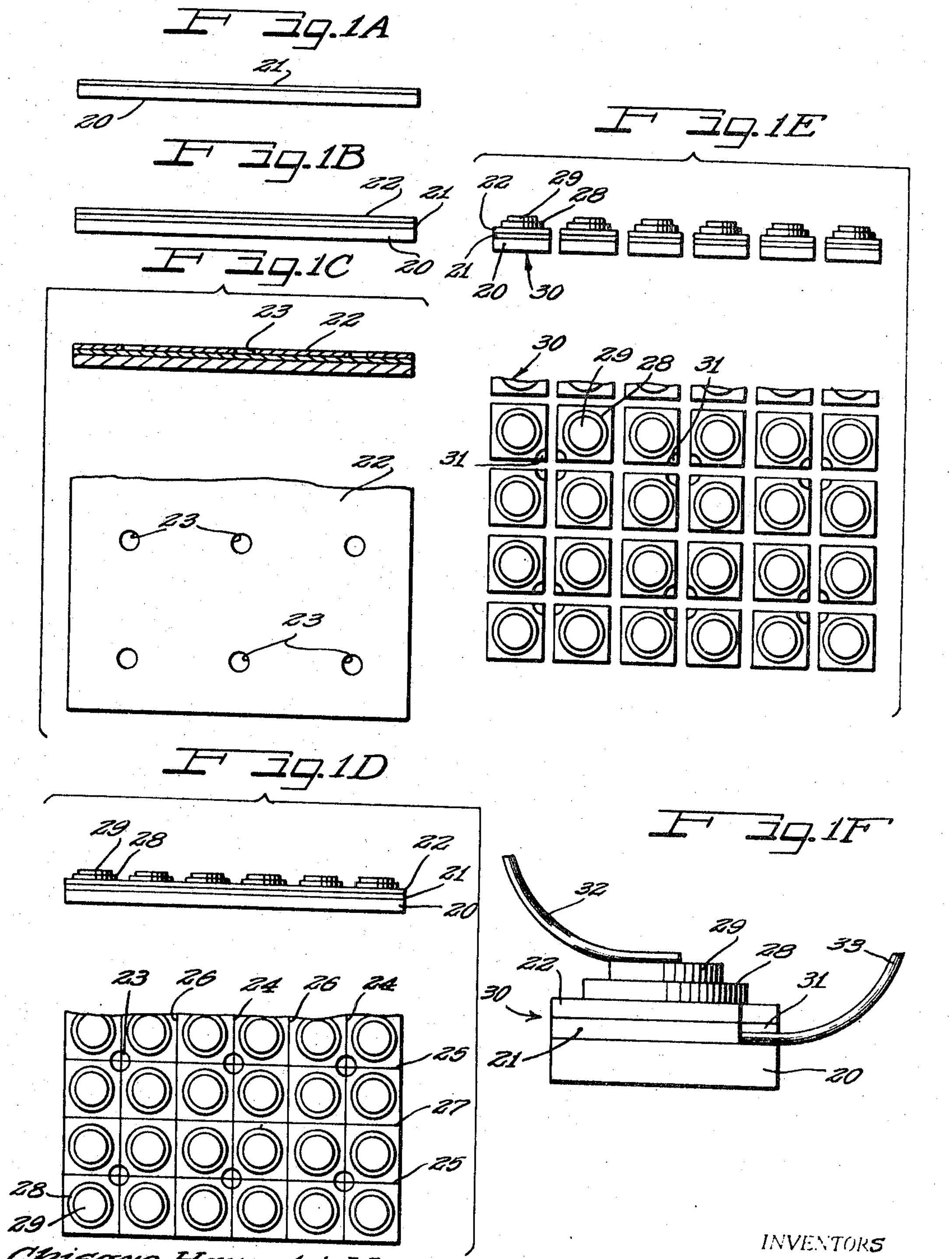
FIGURES 1A to 1F illustrate somewhat diagrammatically the steps involved in the production of a capacitor in one form of the present invention.

In accordance with one form of the present invention, the composite structure illustrated in FIGURE 1B is then selectively treated at predetermined locations, through the use of a suitable mask to provide sites for the attachment of leads. The mask employed for this purpose has a plurality of substantially circular windows therein spaced apart uniformly in rows and columns. An air stream containing a particulate abrasive material such as alumina is directed against the semiconductor layer 22 to selectively remove those portions of the layer 22 which are exposed through the windows of the mask, thereby forming lead attachment portions identified at reference numeral 23 in the drawings. Subsequent to the formation of the lead attachment portions 23, cathode portions are formed on the sheet in each of the areas defined by longitudinal and transverse lines 24 and 25 running through the lead attachment portions 23, and bisecting lines 26 and 27 between the aforementioned lines.

In the next step, an electrically conductive material such as colloidal graphite is deposited on the semiconductor oxide layer 22 through the use of a mask having a plurality of windows, the area of the windows corresponding to a desired capacitance. As best seen in FIGURE 1D, the deposits of graphite 28 may be circular in cross-section, and have a diameter less than the length or breadth of the squares defined by the intersecting lines. Next, silver or silver solder is deposited on top of the graphite deposit 28, the silver deposits being identified at reference numeral 29. The most convenient means for applying the silver deposits is by means of spraying the silver through a suitable mask. As best illustrated in FIGURE 1D, the silver deposits 29 have smaller lateral dimensions than the underlying graphite deposits 28. Next, the assembly shown in FIGURE 1D is severed along the longitudinal and transverse lines 24, 25, 26, and 27 into individual capacitor elements 30, as seen in FIGURE 1E. Each of the elements has a cathode portion provided by the combination of the graphite deposit 28 and the silver deposit 29 and a quadrant 31 of the lead attachment portions 23. Next, lead wires 32 and 33 are attached to the silver deposit 29 and the base metal 20, respectively. The lead 33 is attached at the quadrant 31 and can be secured to the anode by means of resistance welding which serves to break the semiconductor oxide layer 21 thus permitting direct attachment of the lead 33 to the base metal 20.

Figure 2:
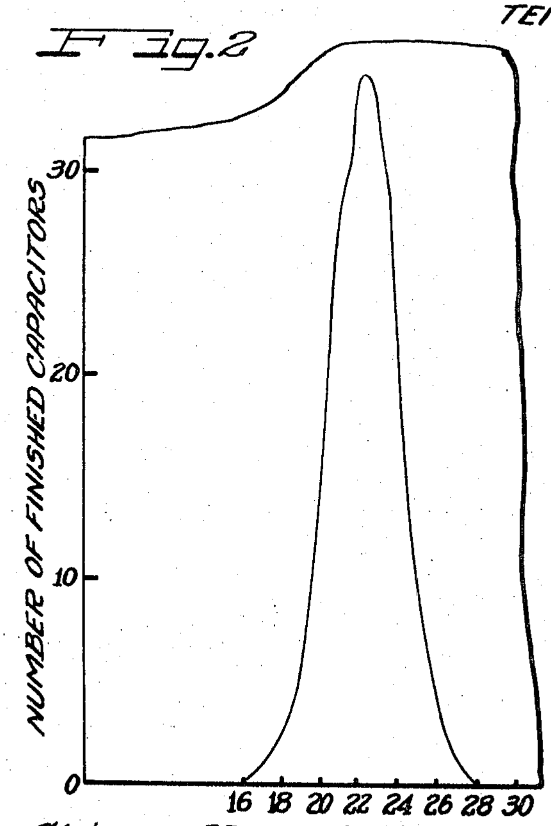
FIGURE 2 is a graph illustrating the distribution of capacitance values in a production run according to the present invention.

The capacitance value of the capacitor is substantially determined by the area of the cathode structure, and the size of the cathode can be readily reproduced to within a range of plus or minus one hundred microns by the use of a suitable mask. Consequently, the capacitors produced according to the present invention have uniform capacitance values. This is illustrated in FIGURE 2 of the drawings which shows a distribution curve for capacitors produced in accordance with the present invention, the ordinates representing the number of capacitors and the abscissae representing the capacitance value in hundredths of a microfarad. The capacitance of almost all capacitors was uniform to within plus or minus ten percent in this run.

It should be noted that in the capacitor of the present invention, the perimeter of the cathode structure does not extend out to the perimeter of the semiconductor oxide material layer. In the manufacturing method of the present invention, the cathode structure is not severed at any time so there is no possibility of short circuiting the elements as occurred previously. In addition, a relatively high resistance is produced between the marginal edges of the cathode structure and the semiconductor oxide material layer so a very low leakage current occurs. To illustrate, a capacitor was formed employing a manganese dioxide semiconductor layer which was applied by electrodeposition using approximately three milliamperes per square centimeter current density evidenced a leakage current of about 0.09 microamperes and a surface resistance of approximately $10^8$ to $10^9$ ohms per square centimeter with an impressed voltage of 6 volts.

It will also be noted that even if the edge portion of the capacitor is broken or damaged, the leakage current due to the damage can be minimized by the presence of the high resistance due to the high resistance present at the marginal edge portion of the semiconductor oxide material layer.

The technique of using the mask to form the lead attachment portion lends itself to rapid operation. For example, by applying an air stream containing alumina powder of approximately twenty-seven microns size at an air pressure of 0.5 kilograms per square centimeter onto a manganese dioxide layer, thirty lead attachment portions could be formed in approximately five seconds. The use of the mask also makes it possible to form a large number of cathode structures at the same time, and with precise areas, so that the desired capacitance values are readily reproduced.

Figure 7:
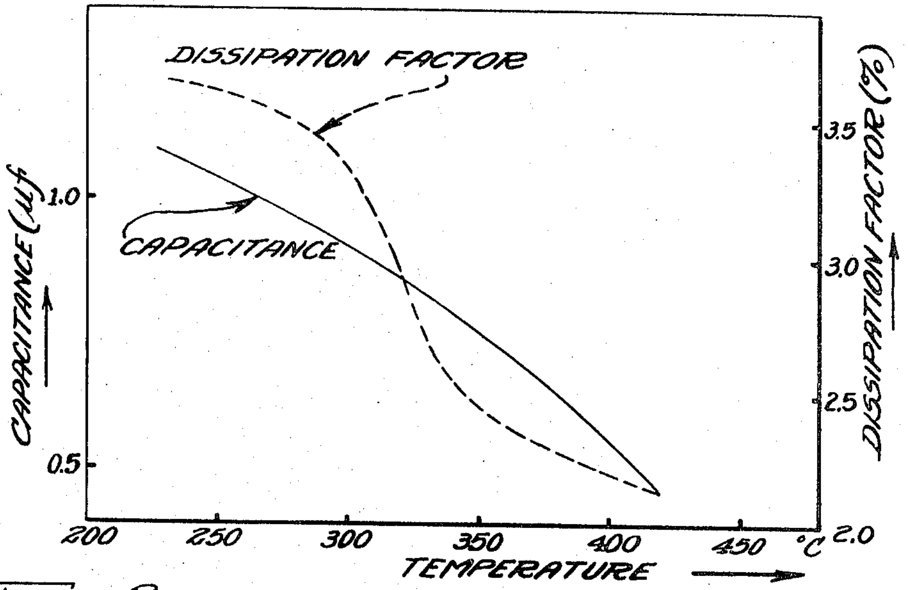
FIGURE 7 is a graph illustrating the variation of capacitance and dissipation factor with changes in temperature of treatment.
Figures 3, 4A, 4B, 5A, 5B, 6A, 6B, 9:
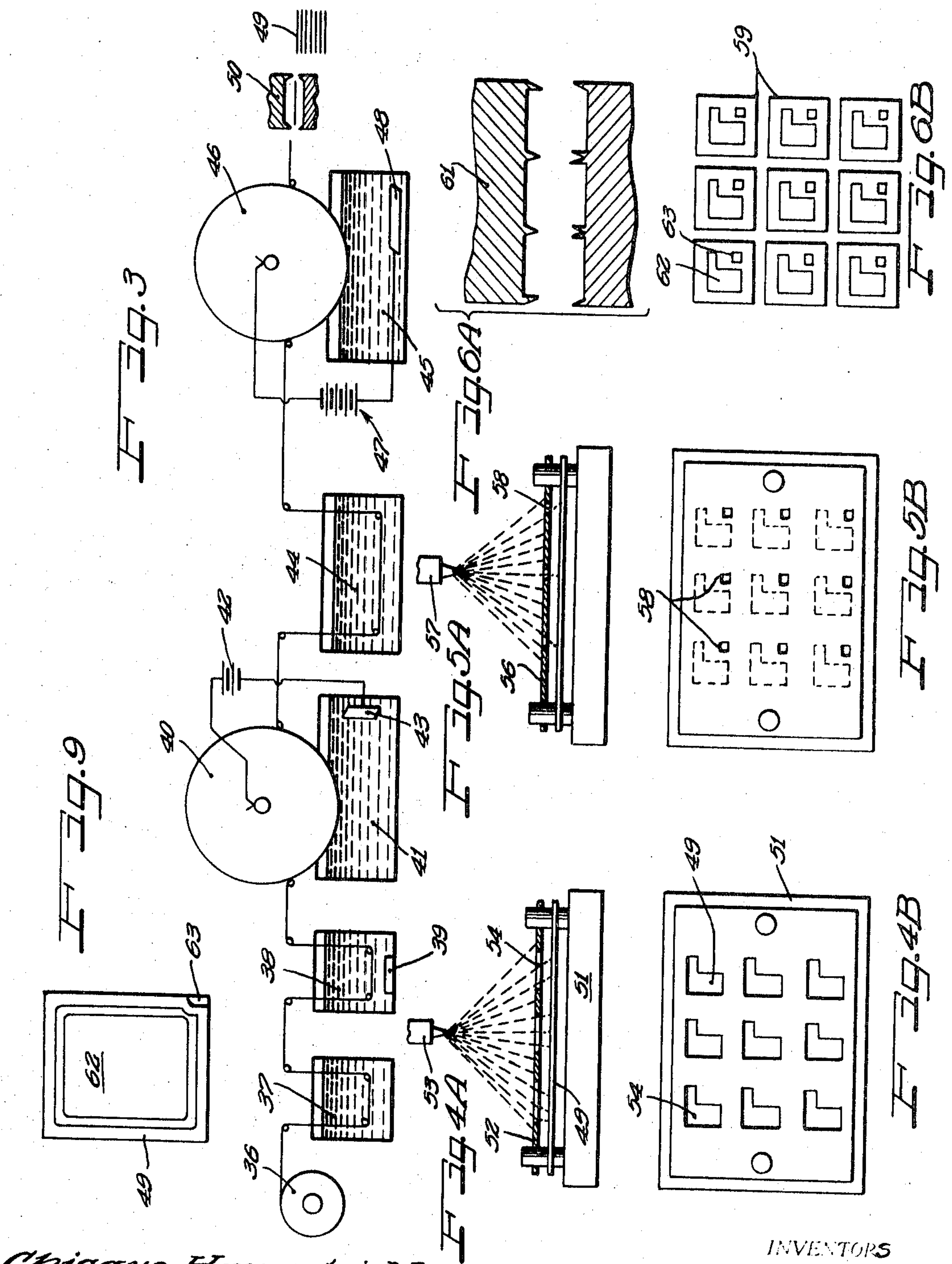
FIGURE 3 is a schematic representation of a continuous process employed for mass producing the capacitances of the present invention.
FIGURES 4A and 4B illustrate the capacitors during an initial stage of their formation.
FIGURES 5A and 5B illustrate the capacitors in the succeeding stage of formation.
FIGURES 6A and 6B illustrate the capacitors in their final stages of formation.
FIGURE 9 is a plan view of a finished capacitor produced by the method of the preceding figures.

In FIGURE 3 there is illustrated a method for forming the capacitors on a continuous basis. A roll 36 of titanium foil having a purity of 99.7 to 99.9% and a typical thickness of seventy-five microns is first cleaned and degreased by passing the foil through a boiling bath 37 of carbon tetrachloride or trichloroethylene. The sheet is then rinsed in a water bath 38 while it is subjected to vibrations by means of a supersonic generator 39 located in the water bath tank. Next, the degreased titanium sheet is applied to the periphery of a drum 40 which immerses it into a fused salt bath 41 which may typically consist of calcium nitrate and sodium nitrate in a 3:7 mol ratio. The temperature of the fused bath is typically on the order of 240 to 410° C. A direct current source, illustrated as a battery 42 applies potential to the anodizing system, with the drum 40 being connected to the anode of the system, and a suitable cathode 43 is immersed in the fused salt bath 41. A DC voltage of 30 to 150 volts is applied for a time sufficient to provide an anodized layer which consists of titanium dioxide on the surface of the titanium sheet. Typical current densities range from about 1 to 5 milliamperes per square centimeter. The relationship of the capacitance and the dissipation factor of the finished capacitor with respect to the temperature of the fused salt bath is illustrated in FIGURE 7. As seen better in that graph, high temperatures are preferred for producing a capacitance of low dissipation factor even though the capacity is lowered somewhat. A temperature of about 360° C. is preferred.

Figure 8:
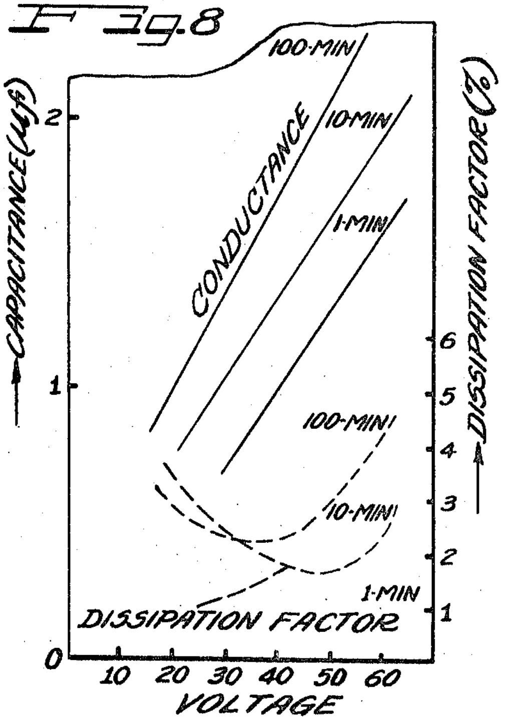
FIGURE 8 is a graph illustrating the changes in capacitance and dissipation factor of the capacitances with changes in voltage during the anodizing treatment.

In FIGURE 8, the effect of anodizing voltage upon conductance and dissipation factors of the resulting capacitor at various time intervals is shown. From this graph, it will be seen that the dissipation factor decreases with increases in voltage, but tends to increase again after longer intervals of time.

After the deposition of the titanium dioxide layer on the titanium metal sheet, the coated sheet is rinsed with water in a water bath 44. The rinsed titanium sheet is then introduced into a solution 45 of a manganese salt such as manganese sulphate, the sheet being partially trained around a drum 46 partly immersed in the manganese salt solution 45. The titanium sheet is connected as the cathode in the plating bath by connecting the drum 46 to the negative terminal of a DC power supply 47. An anode 48 is immersed in the salt solution. The resulting passage of current through the electrolyte salt solution results in the deposition of a semiconductor layer of manganese dioxide on the surface of the titanium metal sheet. It is preferred to use an operating voltage of about 60 to 150 volts for this step, since the voltage in that range insures the provision of a capacitor of low dissipation factor and low leakage current. The manganese dioxide coated titanium sheet is then severed into individual sheets 49 of a size convenient for subsequent processing by means of a press 50.

In the next step, the individual sheets 49 are supported on a support block 51, and a mask 52 having a predetermined arrangement of windows therein is placed over the sheet 49. Then, a suspension of colloidal carbon is sprayed through the mask by means of a spray gun 53. Upon volatilization of the suspending liquid, colloidal carbon particles remain as spaced deposits 54. Then, the mask 52 is removed and replaced by a second mask 56 as illustrated in FIGURES 5A and 5B of the drawings. A suitable abrasive material such as powdered alumina is applied through the holes 58 in the mask located in the areas in which the lead attachment portions are to appear. Finally, the sheet 49 is severed into individual elements 59 by means of a press 61, leaving spaced deposits 62 of the cathode material and lead attachment portions 63 on each of the capacitors. The completed capacitor may then be finished by coating the surface with a lacquer, or by suitable encapsulation.

A typical capacitor produced according to this type of method is shown in FIGURE 9 of the drawings. It will be seen that the cathode deposit 62 has a length and width which is shorter than the corresponding dimensions of the underlying capacitor body. A capacitor measuring 15 by 17.5 millimeters produced in this manner has a capacitance of about ten microfarads. A capacitor measuring 6 by 7.5 millimeters evidenced a capacitance of about 0.1 microfarad.

In the form of the invention illustrated in FIGURES 10A through 10F, reference numeral 70 has been applied to a relatively wide elongated strip of titanium which provides the anode for the finished capacitor. At least one surface of the base metal has a dielectric oxide layer 71 formed thereon and produced in a manner previously described. Subsequently, a plurality of isolated semiconductor oxide material layers 72 are provided in a prearranged pattern on the dielectric oxide layer 71. For this purpose, a water insoluble insulating material 73 which is adherent to the dielectric oxide layer 71 is applied as a vertically and laterally striped grid through the use of a suitable mask. Suitable insulating materials include resins, dimethoxy methane, dibutoxy methane, silicone varnishes, KPR (trademark) or the like. Thereafter, the base metal is immersed in an electrolyte solution consisting, for example, of manganese sulphate and is connected in an electrical plating system wherein the base metal is the cathode and a platinum element is the anode. Current is passed through the solution, resulting in the electrodeposition of the semiconductor oxide material layers 72 within the grid. Since the insulating material of the grid 73 does not permit the passage of current, the semiconductor oxide material is not deposited on the insulating grid work 73. In this manner, a plurality of semiconductor oxide material layers 72 spaced apart by the insulating material layers 73 are formed on the dielectric oxide layers 71. In some cases, it is desirable to have the insulating material 73 extend about the circumferential surface of the base metal 70 and the dielectric oxide layers 71.

Figure 10A:
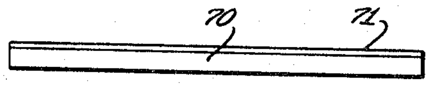
FIGURES 10A to 10F illustrate somewhat schematically a modified method according to the present invention.
Figure 10B:
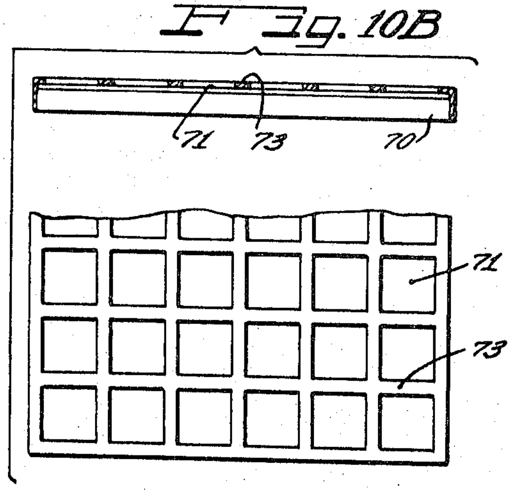
Figure 10C:
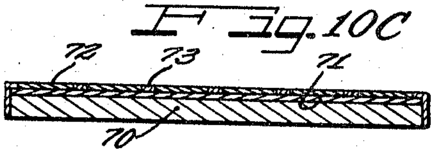
Figure 10D:
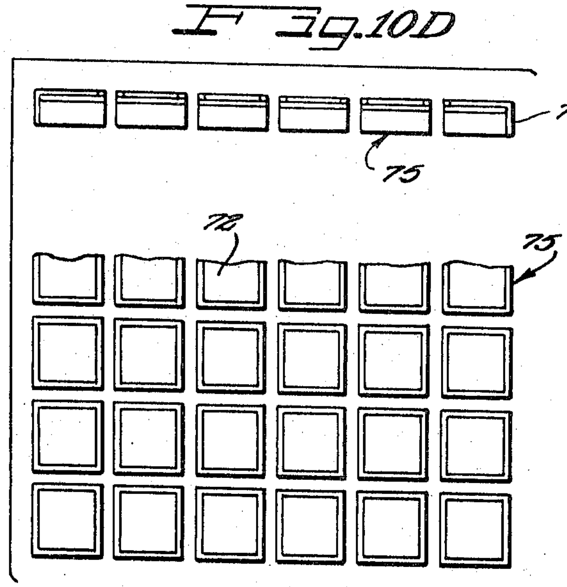
Figure 10E:
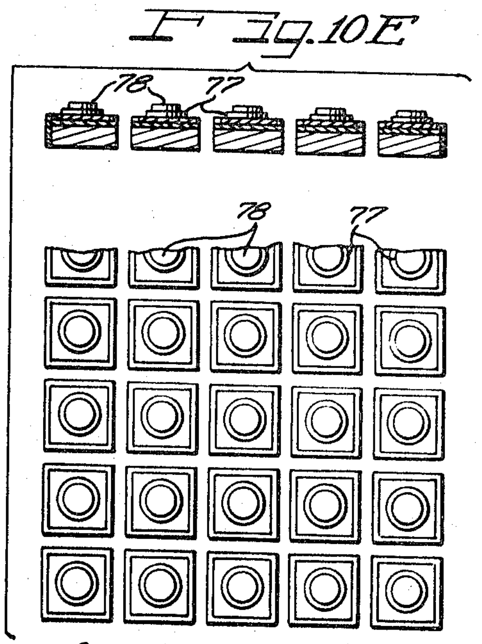
Figure 10F:
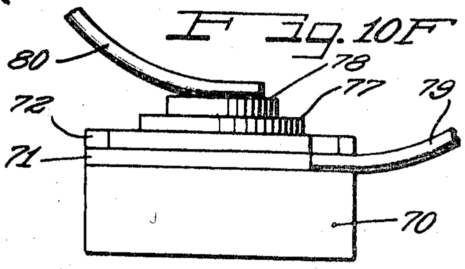

Next, the sheet is severed into individual elements 75 as illustrated in FIGURE 10D. Then, a cathode is formed on the semiconductor oxide material layer 72 by depositing colloidal graphite deposits 77 thereon, followed by the deposition of silver or solder deposits 78 within a predetermined area corresponding to the desired capacitance value. The colloidal graphite may be applied by spraying, and the silver or solder may be deposited by means of vapor deposition. The use of vapor deposition for applying the silver provides enhanced frequency characteristics for the capacitor.

Following the formation of the cathode structure, a lead wire 79 is mechanically and electrically connected to the anode 70 by means of resistance welding or the like, and a lead wire 80 is mechanically and electrically connected to the cathode by means of solder or a conductive adhesive.

Figure 11:
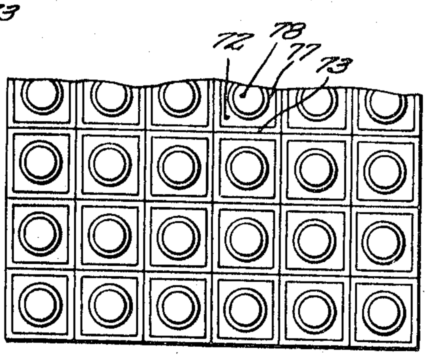
FIGURE 11 is a diagrammatic view of a plurality of capacitors being produced by a modified form of the present invention.

In the foregoing example, the cathode structure is formed after the sheet has been severed into individual elements. It is preferable, however, to form the cathode structure first and before severing, as illustrated in FIGURE 11. In this form of the invention, the colloidal graphite 77 and the silver deposit 78 are formed on each of the semiconductor oxide material layers spaced apart by the insulating material 73. The cathodes are formed simultaneously through the use of a mask having a plurality of windows. The sheet having the cathodes formed thereon is then severed along the insulating material layers 73 into a plurality of individual elements.

While it is preferred that the insulating material of the grid work 73 be deposited by sprayinig, it is possible to deposit this material by coating or printing. In attaching the lead wire 79 to the anode 70, resistance welding may be used by means of which the insulating material layers 73 and the dielectric oxide layers 71 are broken, so that the lead wire 79 is attached directly to the metallic anode 70.

It is also possible to remove the insulating material layers 73 after the electrodeposition of the semiconductor oxide material by means of a suitable solvent, then breaking away the dielectric oxide layer in the areas in which the leads are to be attached, and then attaching the leads.

It should be noted that the semiconductor oxide layer does not extend out to the periphery of the capacitor, in this form of the invention, so that the sheet can be severed along those portions of the dielectric oxide layer on which the semiconductor oxide material is not present. This avoids the possibility of shorting the semiconductor oxide material with the anode, and lowers the leakage current of the finished capacitor. Tests have shown that a capacitor having a capacitance of five microfarads but having no insulating material layers will cause a leakage current of more than 0.1 microampere at a working voltage of 6 volts. A capacitor of the same capacitance value but having an insulating material layer 73 thereon evidences a leakage current of less than 0.03 microampere.

In the case where the insulating material layer 73 is formed on the peripheral portions of the anode and the dielectric oxide layer 71, the concentration of current during the electrodeposition of the semiconductor oxide material can be prevented, thereby avoiding breakage of the dielectric oxide layer 71. We have found, for example, that rejects can be reduced to less than 10 percent when the insulating material layer 73 is formed on the peripheral portion of the anode and the dielectric oxide layer, while the rejects can be as high as 20 to 50 percent when no insulating material layer is used.

It should also be evident that the dielectric oxide layer 71 and the semiconductor oxide material layer 72 can be formed on both sides of the anode producing a non-polar capacitor which can have independent capacitances on both sides of the anode.

In the embodiment illustrated in FIGURE 12, reference numeral 81 indicates a relatively wide strip of a metal such as aluminum on which at least one surface is provided with a dielectric oxide layer 82 consisting of alumina. The alumina can be applied by means of electrolytic oxidation, as is well known in the art. Next, a semiconductor oxide material layer 83 is formed on the dielectric oxide layer 82 by electrodeposition of, for example, manganese dioxide as previously described. Then, a plurality of isolated cathodes are formed on the semiconductor oxide material layer 83. Each of the cathodes is formed by the deposition of colloidal graphite deposits 84 followed by vapor deposition or spraying of silver deposits 85 thereover. Before or after the formation of the cathode structures on the semiconductor oxide material layer, portions of the semiconductor oxide material layer 83 and the dielectric oxide layer 82 are selectively removed to provide void areas 85 in which the base metal 81 is completely exposed. The semiconductor material and the dielectric oxide can be removed in the selected areas by applying an air stream containing abrasive particles thereto through a suitable mask having windows at predetermined locations.

Next, an insulating adhesive material layer 86 consisting principally of rubber is deposited on the entire surface of the sheet as illustrated in FIGURE 12D. The adhesive material layer 86 may be composed, for example, of an adhesive commercially known under the name of "Primer No. 7106" and marketed by the DuPont Company. Next, metallic fine powder layers 87 composed of silver or the like admixed with a solvent capable of disolving the adhesive material layer 86 are formed on the adhesive material layer 86 in the areas overlying the cathode structures, and in the void areas 85 as illustrated in FIGURE 12E. The metallic fine powder layers 87 are then diffused into the adhesive material layer 86 while the adhesive material layer 86 is heat treated at a temperature, for example, of 160° C. for thirty to thirty-five minutes, thereby providing isolated conductive layers 88 surrounded by the insulating adhesive material layer 86 and contiguous to the cathodes and the anodes, respectively, as best illustrated in FIGURE 12F. After the formation of the conductive layers 88, the resulting sheet is severed into a plurality of individual capacitor elements 89, each having a pair of conductive layers 88 diffused into the anode and cathode structures, respectively. Next, lead wires 90 and 91 are applied to the conductive layers 88 to serve as terminals for the anode and cathode. This structure is illustrated in FIGURE 13 in the drawings.

In some cases, the electrically conductive layers 88 can be electrically and mechanically connected by solder deposits 93 directly to a printed circuit 94 formed on a printed circuit board 95 at predetermined positions, without the necessity of using lead wires.

Where the adhesive material layer 86 is deposited on the cathode structures, even if the cathodes are subjected to external forces during cutting or lead attachment, deterioration of the dissipation factor is minimized. Similarly, the provision of the adhesive layer 86 serves to prevent deterioration of the dissipation factor due to thermal and mechanical stresses when the capacitor is connected to external electrodes through lead wires or connected directly to a printed circuit board. Also, the provision of the adhesive layer 86 prevents moisture and dust from entering between the cathode 84 and the semiconductor oxide material layer 83, thereby avoiding variations in the characteristics of the capacitor.

The conductive layer 88 formed by diffusion of the fine powders into the electrodes can be easily soldered making attachment of leads quite easy.

While the foregoing description has dealt with the provision of a conductive layer 88 over a preformed cathode structure, it is also possible to use the conductive layer itself as the cathode by diffusing the metallic fine powders 87 into the adhesive layer 86.

It should be evident that various modifications can be made to the described embodiments without departing from the scope of the present invention.

We claim as our invention:

1. The method of forming a capacitor which comprises electrolytically depositing a dielectric oxide layer on a single side surface of an anodizable metal strip, applying an insulating grid over a pattern of interconnected band areas on the surface of the dielectric oxide layer, thereafter electrolytically depositing a semiconductor oxide onto the dielectric oxide layer within the openings of said grid, forming a cathode structure on each of the areas of said semiconductor oxide while leaving a margin around the periphery of said semiconductor oxide uncovered, and severing the strip along the grid to provide a plurality of individual capacitors.

2. The method of forming a capacitor which comprises electrolytically depositing a dielectric oxide layer on a surface of an anodizable metal strip, electrolytically depositing a semiconductor oxide layer over said dielectric oxide layer through a mask, forming a plurality of spaced cathode structures in a regular pattern over said semiconductor oxide layer, abrading away a regular pattern of semiconductor oxide and underlying dielectric oxide between said cathode structures to thereby provide a regular pattern of spaced areas of exposed metal, coating the entire surface thus resulting with an insulating adhesive, applying electrically conductive powder on the resulting insulating coating over the cathode structures and over said spaced areas, diffusing the metal powder into the areas over which said powder had been applied, and then severing the resulting strip into a plurality of individual capacitors.

References Cited

UNITED STATES PATENTS

| | | | |
|---|---|---|---|
| 793,659 | 7/1905 | Heintz | 117—8.5 |
| 3,240,624 | 3/1966 | Beck | 117—8.5 |
| 3,240,685 | 3/1966 | Maissel | 204—15 |
| 3,254,390 | 6/1966 | Shtsel | 317—230 X |
| 3,375,413 | 3/1968 | Brill | 317—230 |

JAMES D. KALLAM, Primary Examiner

U.S. Cl. X.R.

29—570; 317—230